Nov. 2, 1965  J. H. BOWDEN  3,214,959
AUTO BODY FENDER AND FRAME REPAIR FIXTURE
Filed Nov. 6, 1961  2 Sheets-Sheet 1

James H. Bowden

INVENTOR.

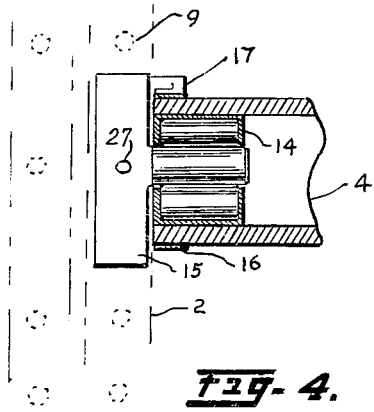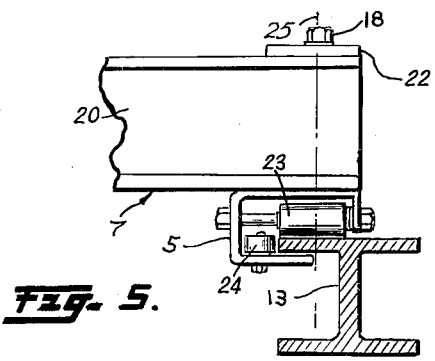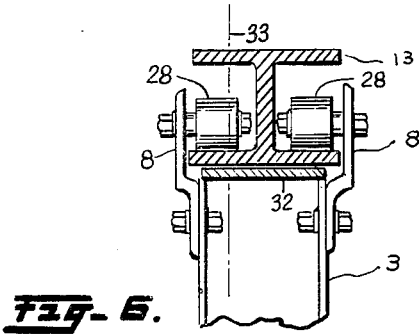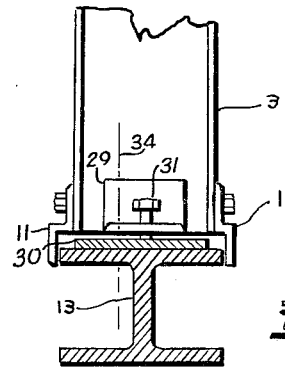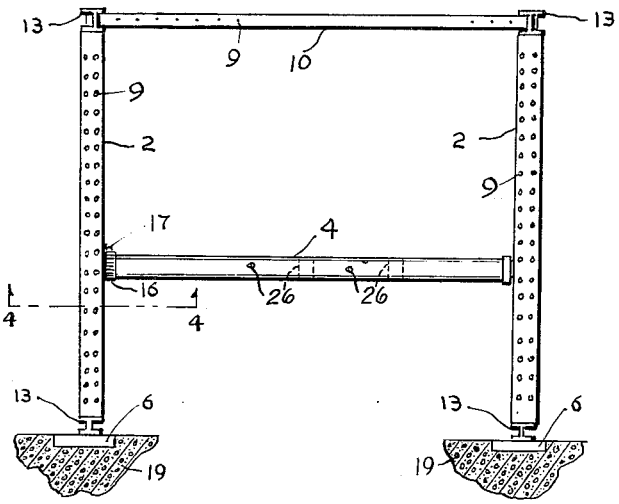

United States Patent Office

3,214,959
Patented Nov. 2, 1965

1

3,214,959
AUTO BODY FENDER AND FRAME
REPAIR FIXTURE
James H. Bowden, 3286 Idlewild Way, San Diego, Calif.
Filed Nov. 6, 1961, Ser. No. 150,593
8 Claims. (Cl. 72—483)

This invention relates to a work rack or frame in and on which an automobile or similar object may be placed for repair and straightening operations. More specifically this invention has in view a work frame so constructed that multiple operations of bending, straightening and load-lifting on the body, engine or frame structure of an automobile may be performed.

In accordance with the present invention there is provided a novel means by which all operations of alignment in locating, stretching, bending and straightening can be very precisely controlled, thus allowing more practical use of existing standard equipment and tooling.

The invention has as a further object the provision of simple and easily operable means for selectively fixing the positions of side, end, and top members in relation to each other in the frame by means of equally spaced holes in the members of the frame structure, said holes in opposite members of the frame being in direct line with each other for the purpose of securing the movable members in perfect alignment, this alignment of all holes being extremely beneficial with the use of tooling in performing work on any object secured in the frame. As an example, when work is being done on an automobile body or frame that has been hit, it is possible to determine the angle of impact, and by the use of standard tooling secured to the frame through the aforesaid holes, it is possible to apply the necessary force from the same angle to pull out dents and other damage. As a further example of work that can be quickly accomplished, the overhead member can be secured by the use of the aforesaid holes directly over the engine of an automobile secured into the frame, and with tools attached to the overhead member, the engine can easily be lifted out of the automobile.

With the above and other objects in view, as will be apparent, this invention consists in the construction, combination, and arrangement of parts all as hereinafter more fully described and illustrated in the accompanying drawings, wherein.

Figure 1:
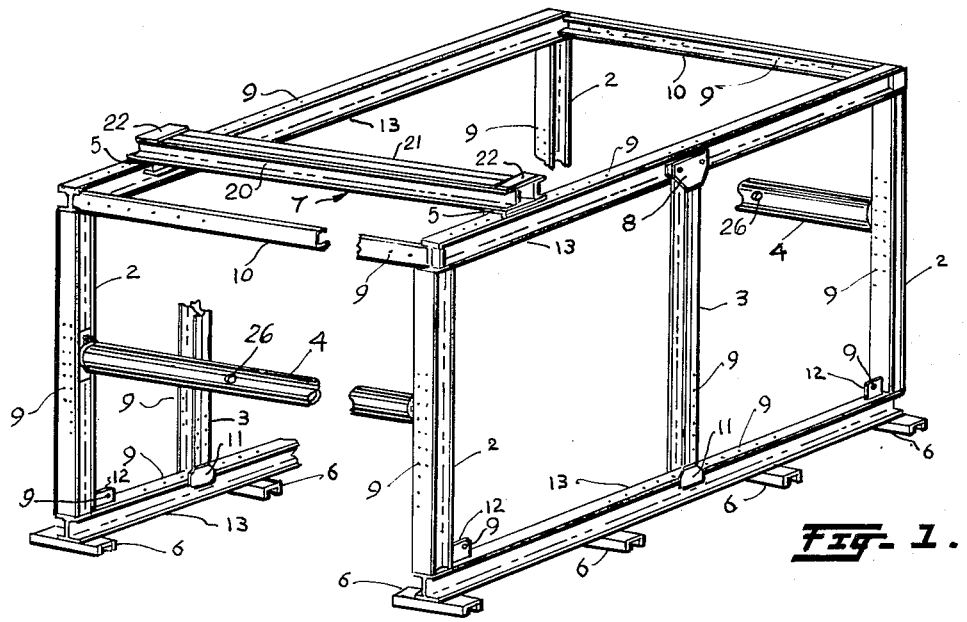
FIG. 1 is a perspective view of a frame constructed according to the present invention.
Figure 2:
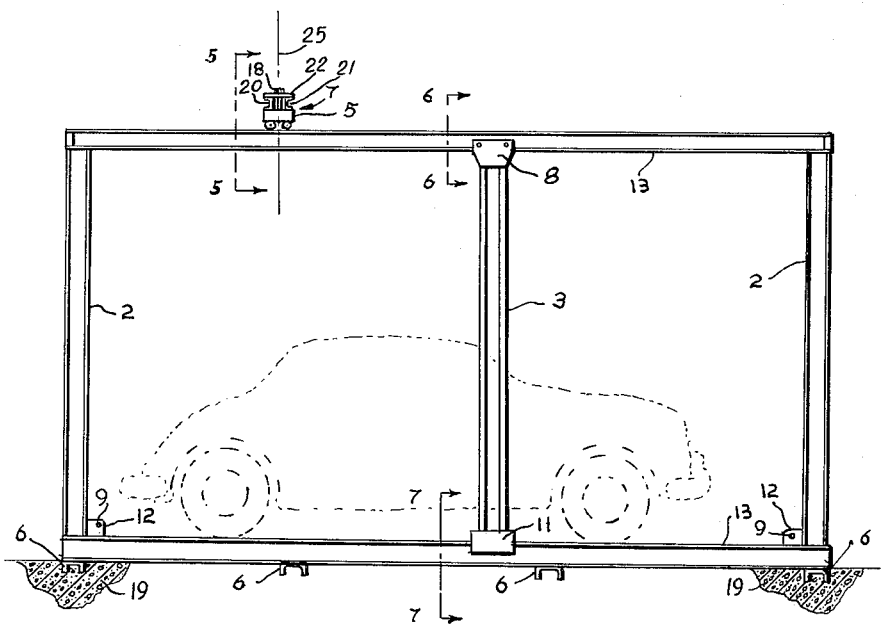
FIG. 2 is a side elevation of the frame illustrated in FIG. 1 with the outline of an automobile shown in position in phantom lines.

FIG. 3 is an end elevation of the frame illustrated in FIG. 1 and showing the method of mounting horizontal member 4 between vertical members 2 and 2;

FIG. 4 is a sectional view of horizontal member 4 taken along line 4—4 of FIG. 3;

FIG. 5 is a sectional view taken along line 5—5 of FIG. 2;

FIG. 6 is a sectional view of upper assembly 8 of vertical member 3 taken along line 6—6 of FIG. 2; and FIG. 7 is a sectional view of lower assembly 11 of vertical member 3 taken along line 7—7 of FIG. 2.

While the present rack or frame is designed to hold and support any type of automobile during repair and

2 straightening operations, it can easily be adapted in conjunction with available means for aircraft components.

Referring first to FIG. 1, the device comprises a frame structure having vertical I-beam corner supports 2 which are fixedly disposed relative to each other. The corner supports 2 have horizontally drilled, equally spaced holes 9 placed in vertical relation to each other. Two horizontal U-shaped cross members 10 are fixedly attached at their extremities to the vertical supports 2 and also have horizontally drilled, equally spaced holes 9 placed in horizontal relation to each other.

Four horizontal linear I-beam members 13 are fixedly attached at their extremities to corner supports 2 and have vertically drilled, equally spaced holes 9 placed in horizontal relation to each other. Four or more base support cross members of inverted U cross section are equally spaced apart and are fixedly attached under the horizontal linear members 13 for setting in concrete or any other holding means to give rigidity to the frame.

Two horizontal tubular members 4 placed between the vertical members 2 have four or more equally spaced holes 26, each hole (see FIG. 3) being drilled at 90 degrees in relation to the adjacent hole. The tubular members 4 are free to rotate in bearings 14 and fitting 15 (FIGS. 3 and 4). The direction and amount of rotation are controlled by ratchet 16 and pawl 17 as indicated in the sectional view of FIG. 4. The tubular members 4 are capable of being raised or lowered between vertical member 2 and can be secured (as by pins, or the like, not shown) passed through holes 9 and through suitable holes 27, FIG. 4, provided in fitting 15.

Two movable vertical I-beam members 3 are mounted between the lower linear member 13 and are free to move horizontally between said members 13 on roller supports 8 and guides 11. The vertical members 3 are capable of locking in any selected position by means hereinafter to be described. The movable vertical members 3 also have equally spaced holes 9 in vertical relation to each other.

A horizontally aligned cross member 7 is mounted above the upper linear members 13 as indicated in sectional view FIG. 5. The movable cross member 7 has roller fittings 5 at its extremities for free movement along upper horizontal members 13 and is capable of being secured at any point in its travel by means of pins 18 which pass through openings 9 in upper horizontal member 13.

A plurality of corner gusset members 12 are placed at the junctions of vertical corner members 2 and linear horizontal members 13 for structural support. Each of the gusset members 12 may be of heavy-gauge plate and preferably has a hole 9 through which various implements can be anchored. Although FIG. 2 shows, as does FIG. 1, gusset members 12 at the lower corners only of the frame, these members 12 can be placed at the upper corners as well.

With reference next to FIGS. 2 and 3, the base support cross members 6 are shown embedded in concrete 19. The lower horizontal linear members 13 are supported by these base support members 6, and the entire frame structure can thus be aligned and leveled.

Reference is next directed to FIGS. 1, 2 and 5 for a more detailed description of the movable cross member 7 which is shown to be made up of two members 20 and 21 of U-beam cross section, placed back-to-back in spaced relation and bridged by plates 22 secured thereto. FIG. 5 shows in detail the roller fitting 5 which slidably fastens the movable horizontal cross member 7 to the linear member 13 to enable smooth movement therealong. As may be seen, a horizontally disposed roller 23 rides on the upper flat surface of the linear member 13, and a vertically mounted idler roller 24 engages the vertical edge of the beam to reduce friction. Pin 18 extends along dashed line 25 and through a suitable opening (not shown) provided therefor in plate 22, thence between the spaced members 20 and 21 (member 20 only appearing in FIG. 5), thence through a suitable opening (not shown) in fitting 5, and thence into an opening 9 (not shown in the sectional view of FIG. 5), thereby to lock the cross member 7 in a selected position to the upper linear member 13. It will be understood that the arrangement shown in FIG. 5 is provided in similar manner at the other end of cross member 7. As shown in FIGS. 1 and 2, each fitting 5, like plate 22, bridges spaced members 20 and 21 and is secured thereto.

Reference is now directed to FIGS. 1, 2, 6 and 7 for a more detailed description of the mounting arrangement for movable vertical members 3 to enable smooth movement thereof along and between the upper and lower linear members 13. The roller support 8, of which there is one on each side of each movable vertical member 3, fastens the same to the upper horizontal linear member 13, as may best be seen in FIG. 6. Members 8 respectively have horizontally disposed rollers 28 mounted on opposite sides of the vertical portion of the I-beam and ride on the upper surface of the lower part of the I, much in the manner of a rolling hanger or a curtain door. FIG. 7 shows, in similar detail, the supporting structure at the lower end of the vertical movable member 3 and its cooperative relation with respect to the lower horizontal linear member 13. As can be seen, the lower end of member 3 does not have rollers but rather has guides 11 secured to opposite sides thereof and a thrust plate assembly 29–31 for engaging the lower horizontal linear member 13.

The thrust plate assembly comprises an angle member 29 secured as by welding to member 3, a thrust plate 30 disposed in closely spaced relation to the upper surface of lower linear member 13, and a locking bolt 31 threadedly carried by angle member 29 and rotatively secured to thrust plate 30 in a well known manner. When member 3 has been moved between and along upper and lower members 13 to a selected position therealong, locking bolt 31 is turned to lock number 3 in the selected position. This is accomplished due to the fact that the turning of bolt 31 causes angle member 29 to move up and away from thrust plate 30 which now rigidly seats against the lower linear member 13. As angle member 29 moves up, its connected vertical member 3 also moves up with the result that a plate 32 secured as by welding to the top end thereof (FIG. 6), moves into locking engagement with the under surface of upper linear member 13. It will be understood that plates 30 and 32 are normally spaced from their respective lower and upper linear members 13 so as to permit free movement of vertical member 3 therebetween and therealong.

In addition to, or as a substitute for the aforedescribed thrust plate locking arrangement, the vertical members 3 can be anchored in a selected position by utilizing any of the holes 9 in the upper and lower horizontal linear members 13, using suitable locking pins (not shown) disposed along the lines 33 and 34 respectively of FIGS. 6 and 7, these pins being used much in the same manner as pin 18 in FIG. 5.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new and desired to be secured by Letters Patent of the United States is:

1. A frame device for receiving and enclosing a vehicle to be repaired therein and comprising the combination of: a pair of upper and a pair of lower linear members disposed horizontally at opposite sides of the frame respectively and having vertically drilled holes equally spaced in horizontal relation to each other; four vertically disposed corner members fixedly attached at their upper and lower extremities to said linear members and having horizontally drilled holes equally spaced in relation to each other; two cross members disposed horizontally at opposite ends of the frame respectively and fixedly secured at their extremities to said corner members at their upper extremities, said cross member having horizontally drilled holes equally spaced in horizontal relation to each other; and two movable members extended respectively between said two different pairs of said linear members and adjustably movable longitudinally thereof selectively into any one of a plurality of fixed positions therealong.

2. A frame device as set forth in claim 1 wherein said two movable members comprise vertical movable members having horizontally drilled holes equally spaced in vertical relation to each other, said movable vertical members being disposed one on each side of the frame and free to travel along and between said upper and lower linear members and capable of being locked at any selected point of travel therealong.

3. A frame device as set forth in claim 2 and further comprising a roller assembly disposed at the upper extremity of each of said movable vertical members for engaging its upper linear member.

4. A frame device as set forth in claim 3 and further comprising a guide and thrust plate assembly disposed at the lower extremity of each of said movable vertical members for engaging with its lower linear member and guiding said vertical member within the frame, and guide assembly including a thrust plate disposed in parallel relation and adjacent to the upper surface of said lower linear member, said plate having a vertically disposed bolt member for securing said movable vertical member in its selected position on tightening said bolt member.

5. A frame device as set forth in claim 1 wherein one of said two movable members comprises a pair of horizontally disposed movable cross members secured together in spaced parallel relation with respect to each other, said movable cross members being free to travel on top of said upper linear members and capable of being locked at any selected point of travel therealong, a pair of roller assemblies disposed respectively at the extremities of said movable cross members for engaging said upper linear members and enabling smooth and free movement of said movable cross members on top of said frame, each of said roller assemblies having a vertically disposed pin engageable with a selected hole in its upper linear member for locking said movable cross members at any selected point of travel therealong, said roller assemblies respectively having vertically disposed rollers engageable respectively with the inside surfaces of said upper linear members to hold said movable cross members in alignment in the frame and to prevent jamming of the same therein.

6. A frame device as set forth in claim 1 and further comprising two members of tubular cross section horizontally disposed respectively at the ends of said frame, said tubular members being free to move vertically within said ends of the frame, a pair of bearing assemblies for each of said tubular members disposed respectively at the extremities thereof for engaging with said vertical corner members disposed at its end of the frame, said bearing assemblies respectively having pin holes alignable with said holes in said corner members for locking said tubular members thereto selectively in any one of a plurality of fixed positions vertically thereof, each of said bearing assemblies having a ratchet and pawl, each of said tubular members having at least one rod receiving hole disposed at right angles to its axis for turning the same.

7. A frame device as set forth in claim 1 and further comprising at least four cross members disposed underneath said lower linear members and fixedly attached thereto for rigidly anchoring the frame device.

8. A frame device as set forth in claim 1 and further comprising a plurality of gusset members secured to said linear and vertical corner members in the corners of the frame, said gussets each being of metal plate and having a hole therethrough.

References Cited by the Examiner
UNITED STATES PATENTS

| | | | |
|---|---|---|---|
| 2,140,686 | 12/38 | Bennett | 153—32 |
| 2,442,425 | 6/48 | Merrill | 153—32 |
| 2,559,250 | 7/51 | Jackson | 153—32 |
| 2,668,744 | 2/54 | Cockrell | 248—298 X |
| 2,705,040 | 3/55 | Howick | 153—32 |
| 2,718,913 | 9/55 | Smith | 153—32 |
| 2,725,619 | 12/55 | Miller | 212—11 X |
| 3,020,015 | 2/62 | Seplavy | 153—32 |
| 3,088,513 | 5/63 | Marquardt | 153—32 |

CHARLES W. LANHAM, *Primary Examiner.*

ROBERT C. RIORDON, *Examiner.*